Sept. 9, 1930.     E. SEASHOLTZ     1,775,373
COUPLER CONNECTER
Filed April 18, 1929
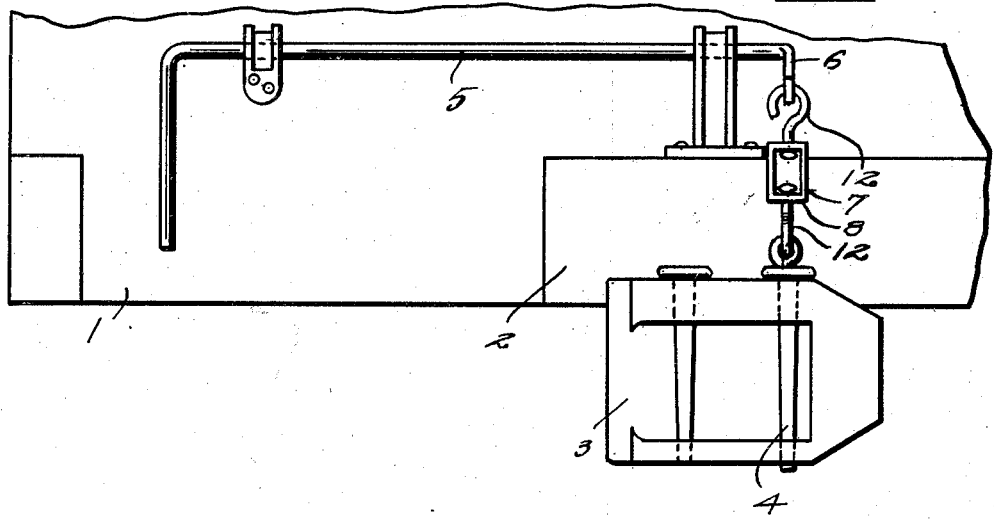
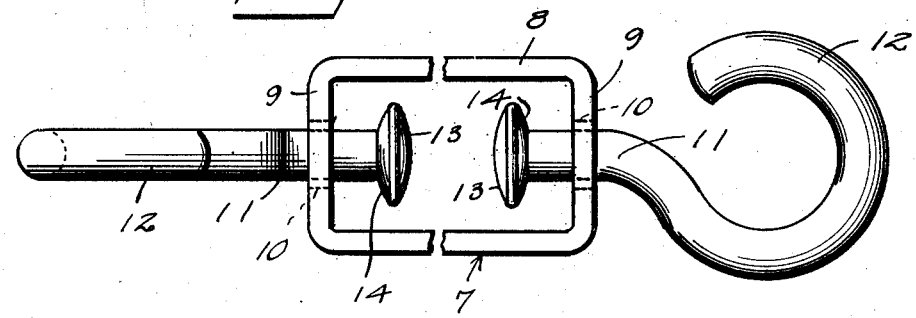
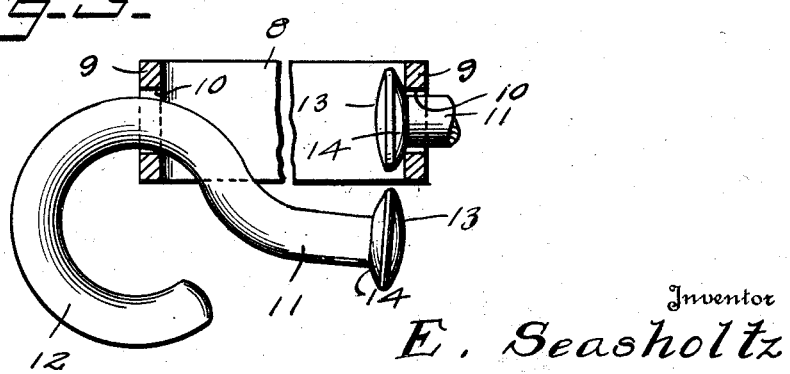
Inventor
E. Seasholtz
By Watson E. Coleman
Attorney Patented Sept. 9, 1930

1,775,373

UNITED STATES PATENT OFFICE

EMORY SEASHOLTZ, OF WAYCROSS, GEORGIA

COUPLER CONNECTER

Application filed April 18, 1929. Serial No. 356,164.

This invention relates to swivel connecting devices and pertains particularly to an improved type of connecter designed for coupling the control bar of a railway car coupling mechanism with the coupling pin of the mechanism.

The primary object of the present invention is to provide a connecter which cannot become twisted or kinked to interfere with the operation of the coupling mechanism operating bar in association with which it is used.

Another object of the present invention is to provide a connecter which may have any one of the three units of which it is made up readily replaced without the necessity of removing the entire mechanism to which it is connected in the event that one of these units becomes damaged.

A still further object of the invention is to provide a connecter between an operating element and a coupling pin which will freely turn and bend without becoming twisted or kinked.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a view in elevation of a portion of one end of a box car showing the application of the device embodying this invention.

Figure 2 is a plan view of the connecter.

Figure 3 is a sectional view through the connecter showing one of the hooks in partially removed position.

Referring to the drawing in detail, the numeral 1 indicates a portion of one end of a car showing the sill 2 to the underface of which one member of a car coupling mechanism 3 is attached.

The coupling pin 4 of these couplers is normally raised for an uncoupling operation by the oscillation of a shaft 5 secured transversely of the car body in the manner shown, this shaft at its inner end having a crank arm 6 to which the connecter embodying the present invention, and which is indicated as a whole by the numeral 7, is attached. As is clearly shown in Figure 2 the present coupling device comprises a rectangular link 8 of substantial width, each end portion 9 thereof being provided with an aperture 10. Extending through each of the apertures 10 is a straight shank portion 11 of a hook 12, the end of the shank being enlarged to form a head 13, the surface of which is tapered as indicated at 14, which tapered face bears against the inner end of the passage through which the shank passes.

As shown in Figure 1, one of the hooks 12 is connected with the end of the crank arm 6 while the other hook is engaged through the eye carried upon the upper end of the coupling pin 4. Due to the engagement of the tapered underface of the head 13 of each hook with the adjacent portion of the bar 9, a substantially universal connection is set up between the hook and the link connecting it with the associate hook so that a kinking of the connection between the crank arm 6 and the coupling pin 4 is impossible. By forming the shanks 11 substantially straight throughout a portion of their length movement of the hooks 12 longitudinally of the connecting link 8 is permitted to a certain extent so that the connecter may be shortened up slightly to permit freer action between the crank arm and the coupling pin. As shown in Figure 3, either one of the hooks may be readily removed from engagement with the cross piece 9 of the link to which it is attached if it is necessary to replace the hook or the link.

From the foregoing description it will be readily seen that the connecter herein described will prevent the usual annoyance associated with the operation of the shaft 5 of car coupling mechanisms, that is, the kinking of the chain connection ordinarily employed between the end of the crank and the coupling pin.

Having thus described my invention, what I claim is:—

A connecter of the character described, comprising an open link body consisting of a pair of relatively broad elongated side members and a pair of relatively broad end members connecting the ends of the side members, each of said end members having an aperture therethrough, a pair of hooks each having a straight shank passing through one of said apertures, and a head upon the end of each shank, said heads being of a size to prevent the shanks pulling through the apertures and the apertures being of materially greater diameter than the shanks whereby angular adjustment of the shanks relative to the end members is permitted for the removal of the hooks from the end members.

In testimony whereof I hereunto affix my signature.

E. SEASHOLTZ.